United States Patent
Davis et al.

(10) Patent No.: US 11,153,340 B1
(45) Date of Patent: Oct. 19, 2021

(54) ELIMINATION OF LISTEN PORTS ON A PUBLICALLY ACCESSIBLE COMPUTER

(71) Applicant: FullArmor Corporation, Boston, MA (US)

(72) Inventors: Charles A. Davis, Sugar Land, TX (US); Matthew Randall Sousley, Cashmere, WA (US); Michael Hilton Manlief, Lexington, MA (US); Scott Jackson, Issaquah, WA (US); Robert C. Almond, Boston, MA (US)

(73) Assignee: FullArmor Corporation, Boston, MA (US)

( * ) Notice: Subject to any disclaimer, the term of this patent is extended or adjusted under 35 U.S.C. 154(b) by 0 days.

(21) Appl. No.: 17/225,331

(22) Filed: Apr. 8, 2021

(51) Int. Cl.
*H04L 29/06* (2006.01)

(52) U.S. Cl.
CPC .......... *H04L 63/1433* (2013.01); *H04L 63/08* (2013.01); *H04L 63/102* (2013.01); *H04L 63/1408* (2013.01)

(58) Field of Classification Search
CPC ... H04L 63/08; H04L 63/102; H04L 63/1408; H04L 63/1433

USPC .......................................................... 726/4
See application file for complete search history.

(56) References Cited

U.S. PATENT DOCUMENTS

| 2018/0063134 A1* | 3/2018 | Petrovykh ............. H04L 63/102 |
| 2019/0334951 A1* | 10/2019 | Konetski ................ H04L 63/20 |

* cited by examiner

*Primary Examiner* — Benjamin A Kaplan
(74) *Attorney, Agent, or Firm* — Schwegman Lundberg & Woessner, P.A.

(57) ABSTRACT

Security of a protected computer that is accessible via a public network is enhanced by eliminating or reducing open network ports on the protected computer. To reduce open network ports, the protected computer initiates a control connection to an enterprise controller. A request for service from a client device is made to the enterprise controller. If appropriate, the request is then forwarded by the enterprise controller to the protected computer over the control connection. If the request is accepted by the protected computer, the protected computer opens an additional connection to the enterprise controller to provide for streaming of input and output between the task performed on the protected computer and the enterprise controller. This input and output is forwarded by the enterprise controller to the client device and/or protected computer.

20 Claims, 9 Drawing Sheets

ELIMINATION OF LISTEN PORTS ON A PUBLICALLY ACCESSIBLE COMPUTER

BACKGROUND

Securing computer systems that are accessible via a public network continues to be a challenge across the world. Reports of data compromises resulting from lax security are common, with the personally identifiable information of millions of people accessed by nefarious actors. Many solutions are available to reduce the risk of security threats. These include intrusion detection systems, security audits, biometric authentication, two-factor authentication, and other methods. Despite the many techniques employed to combat nefarious actors, security breaches remain all too common. Thus, improved methods of reducing security vulnerabilities of computer systems are needed.

DETAILED DESCRIPTION

Figure 1:
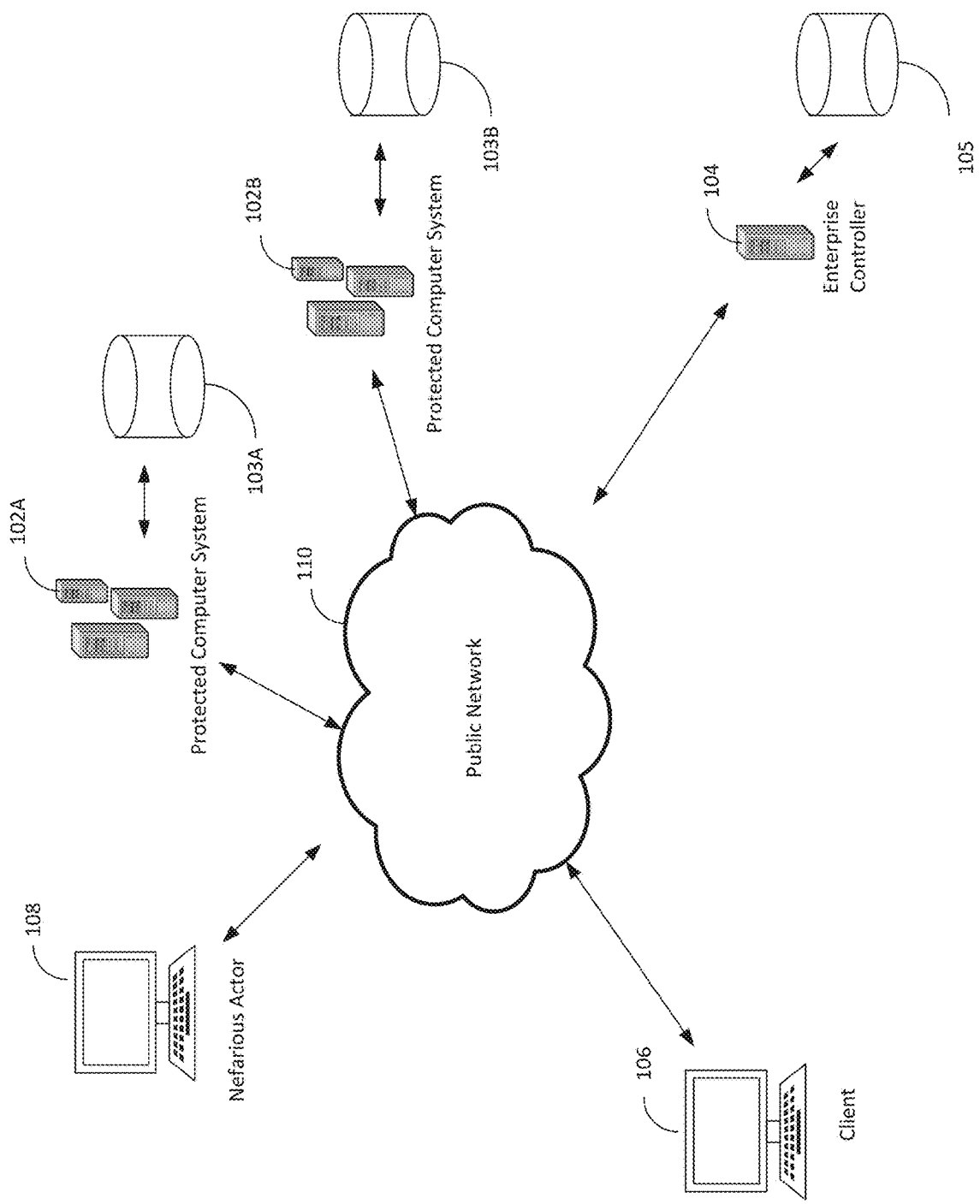
FIG. 1 is an overview diagram of a networked system implemented in one or more of the disclosed examples.

As discussed above, ensuring the security of computer systems remains a challenge. One aspect of this challenge relates to a vulnerability of computer systems when listening on a network port for incoming connection requests. For example, one common practice is for a service provided by a computer system to listen for connection requests on a well-known port. In some examples, a file transfer protocol service listens on port 21, a secure shell (SSH) service listens on port 22, a telnet service listens on port 23, a simple mail transfer protocol (SMTP) daemon listens on port 24, or an HTTP daemon listens on port 80.

As discussed above, listening on an open port for service requests represents one attack vector commonly used by nefarious actors to compromise a computer system. To the extent open ports can be reduced or even eliminated, security of the computer system is improved. To that end, the disclosed examples provide for a reduction or elimination of open ports on a protected computer system. To accomplish this, the protected computer system is configured to initiate a control connection to an enterprise controller. The enterprise controller runs on a separate computer system. Generally, the protected computer system does not open any network ports or accept network connections on any ports, but instead primarily or even, in some examples, exclusively, makes its services available via the network by initiating connections to the enterprise controller.

For a client device to access services provided by the protected computer, the client device connects first with the enterprise controller. Assuming the client device and/or user account being accessed by the client device properly authenticates with the enterprise controller, the client device is able to request services with the protected computer. The enterprise controller verifies that the client device and/or user account initiating the request is configured on an access list of the protected computer. After verification that the client device is permitted to access the protected computer, the enterprise computer, transmits, over the control connection, a request for the protected computer to initiate services with the client device.

The protected computer, in some examples, performs one or more verifications to confirm that the client device and/or user account is included in an access list that permits the protected computer to perform functions on behalf of the client device and/or user account.

If the protected computer determines the client device and/or user account is so authorized, the protected computer initiates a second connection to the enterprise controller. After this second connection isne; established, in some examples, the protected computer indicates the second connection has been established for the purpose of servicing the client device and/or user account. The enterprise controller then facilitates data flow between the client device and the protected computer via the second connection.

In at least some examples, the protected computer also initiates a third connection to the enterprise controller. The third connection is used for logging data communications between the client device and/or user account and the protected computer. Thus, any input provided by the client device to the protected computer is streamed, by the protected computer, over the third connection. Any output generated by the protected computer as a result of input provided by the client device and/or user account is also streamed over the third connection. Upon receiving the information over the third connection, the enterprise controller 204 stores the data in a stable data storage, forming a record of operations performed by the client device and/or user account on the protected computer.

The example architecture enables viewing or monitoring of a live session on the second connection (e.g., channel) from the data stream on the third connection (e.g., channel) on the enterprise controller. This allows an authenticated and approved user, with appropriate permissions, to terminate the second connection from the enterprise controller in the event nefarious or unauthorized commands are transmitted from the client device to the protected computer.

Further, the architecture proposed by this disclosure seeks to eliminate, in at least some examples, all or at least some open network ports on the protected computer. As any network connections between the protected computer and the enterprise controller are initiated by the protected computer, and typically utilize a secure protocol such as secure hypertext transfer protocol (HTTPS), there is less or even no ability for a nefarious actor to detect these connections or interfere with those communications. The result is a more secure, protected computer.

FIG. 1 is an overview diagram of a networked system implemented in one or more of the disclosed examples. FIG. 1 shows a protected computer system 102A, a protected computer system 102B, an enterprise controller 104, a client device 106, and a nefarious actor device 108. Each of the protected computer system 102A, protected computer system 102B, the enterprise controller 104, the client device 106, and the nefarious actor device 108 are in communication with a public communications network 110, and can exchange data with each other over the public communications network 110.

Because the protected computer system 102A and the protected computer system 102B are communicatively coupled to the public communications network 110, the protected computer system 102A and/or the protected computer system 102B can be attacked by the nefarious actor device 108. For example, the nefarious actor device 108 performs, in some circumstances, a "port scan" of one or more of the protected computer system 102A and/or the protected computer system 102B. The "port scan" allows the nefarious actor device 108 to identify one or more network ports on the protected computer system 102A and/or the protected computer system 102B. If such ports are identified, the protected computer system 102A or protected computer system 102B is listening for connection requests from the public communications network 110 on these visible ports. In some cases, such network ports provide opportunities for the nefarious actor to compromise the protected computer system 102A and/or the protected computer system 102B. For example, an open network port provides an opportunity for the nefarious actor to execute a denial of service attack, a buffer overflow attack, or attempt to comprise the protected computer system 102A or protected computer system 102B by entering authentication information that has been compromised.

At least some of the disclosed examples reduce opportunities for the nefarious actor device 108 to attack the protected computer system 102A and/or the protected computer system 102B by providing access to the protected computer system 102A and/or the protected computer system 102B via an enterprise controller 104. Each of the protected computer system 102A and/or the protected computer system 102B initiates outgoing connections to the enterprise controller 104 only, at least in some examples, and these protected computer systems do not generally listen on any open ports accessible via the public communications network 110.

When the client device 106 accesses functionality on either of the protected computer system 102A and/or the protected computer system 102B, the client device 106 contacts the enterprise controller 104, and indicates a request to access said functionality. The enterprise controller 104 then makes a request to the respective protected computer system on behalf of the client device 106, via a control connection. The control connection was previously initiated by the protected computer system 102A and/or the protected computer system 102B to the enterprise controller 104.

As one operative example, the client device 106 requests to establish a bash command line shell on the protected computer system 102A. To accomplish this task, the client device 106 contacts the enterprise controller 104, indicating this request. The request also indicates the client device 106 seeks to interact or otherwise access the protected computer system 102A. The enterprise controller 104, after verifying the client device 106 has access to the protected computer system 102A, indicates, via the control connection, a command to open a bash shell. The protected computer system 102A then spawns a bash daemon process and initiates a second data connection or session to the enterprise controller 104. Input and output associated with the bash daemon are then directed, by the protected computer system 102A, over the second session. Because the protected computer system 102A initiates both the control connection and the data connection, the protected computer system 102A does not need to expose a network port for listening for requests from either the client device 106 or the enterprise controller 104. This contrasts with other architectures that would have the protected computer system 102A listen on an open network port for incoming connection requests.

Once the connection is established between the protected computer system 102A and the enterprise controller 104, in this operative example, the client device 106 is able to send bash commands to the protected computer system 102A via the enterprise controller 104. The commands are provided from the enterprise controller 104 to the protected computer system 102A via the second session. Any output from the bash daemon is also provided back to the enterprise controller 104 from the protected computer system 102A via the second session. Upon completion of any tasks associated with the bash shell, the client device 106 indicates to the enterprise controller 104 that the bash shell can be closed. The enterprise controller 104 disconnects the second session and the protected computer system 102A, in response, closes the bash daemon process that had been created to service the client device 106. If a logging connection was created along with the second session, the logging connection is also closed.

Figure 2:
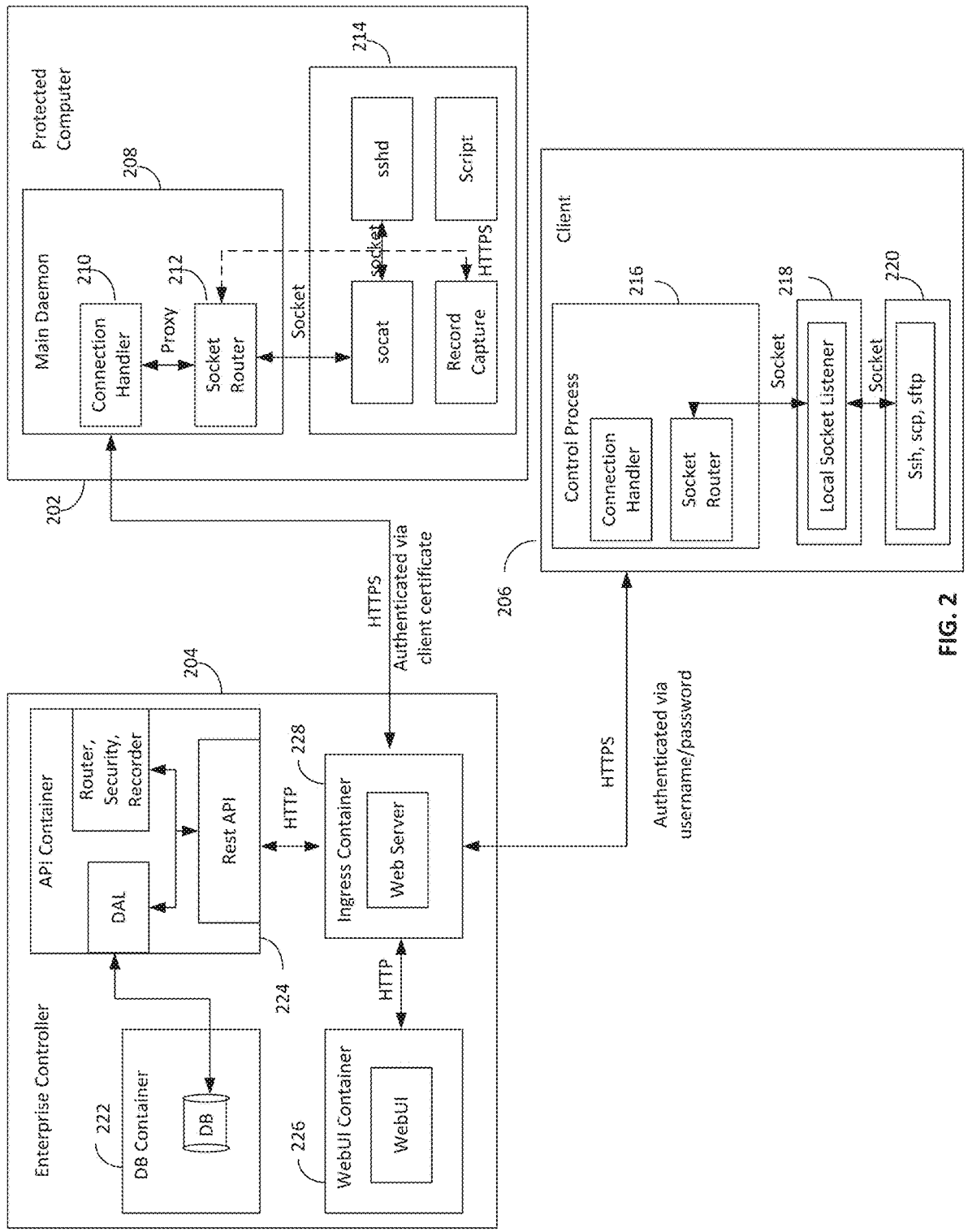
FIG. 2 is a block diagram of an example nets networked system implemented in one or more of the disclosed examples.

FIG. 2 is a block diagram of an example networked system implemented in one or more of the disclosed examples. FIG. 2 shows a protected computer 202, enterprise controller 204, and client device 206. The protected computer 202 includes a main daemon 208, The main daemon 208 runs a connection handler component 210 and socket router component 212. For each connection request from a client device, the protected computer 202 launches a stack component 214. In some examples, the protected computer 202 receives a connection request from the enterprise controller 204 (e.g., over socketio). The connection request requests a new session be established between the protected computer 202 and a client device 206. To establish the new session between the client device 206 and protected computer 202, several functions are performed. The protected computer 202 creates a new first data connection back to the enterprise controller that is allocated for use with the new session. In some examples, the protected computer 202 creates a new configuration file for use with the new session. In some examples, the configuration file defines a script file that is used to capture data exchanged over the new session. The protected computer 202 also, in some examples, opens a new file to store logging data of the session. The protected computer 202 binds a random local port to a new first process, which utilizes the newly created configuration file. The new first process will be used to perform functions requested by the client device 206. The first new process runs a bash shell program in some examples, but the use of other types of programs or processes is within the scope of the disclosed subject matter. In some examples, a "socat" program is launched to perform this binding operation. The local port is configured for a single use, in some examples. In some examples, the protected computer 202 links or proxies between the first data connection to the newly created first process via the local port. Some examples launch, along with the new first process, a new second process that performs logging or record capture functions on input and output exchanged between the first new process and the first data connection or session. In some examples, the new second process initiates an additional second logging connection to the enterprise controller 204 for purposes of logging data captured over the first data connection back to the enterprise controller 204 for storage. In some examples, the launching of the new second process is conditioned on the first data connection being based on use of an SSH shell.

Once the session is established, data flows from the client device 206 through the enterprise controller 204 to the protected computer 202, and vis-versa. When data arrives at the protected computer 202, it flows from the main daemon 208 via the socket router component 212 to the stack component 214 associated with the new session.

If the client device 206 requests a disconnect (or a failure in the connection between the protected computer and the enterprise controller 204 occurs, or a failure in the connection between the enterprise controller 204 and the client device 206 occurs), several operations are performed to tear down the new session. For example, both the first data connection and second logging connection discussed above are closed. The enterprise controller 204 initiates the closing of the first data connection (e.g., when the session is gracefully torn down). In response to the first data connection being closed, the protected computer 202 disconnects the socket for the first data connection from the socat process discussed above. Since the socat process was launched in a single user configuration, the socat process exits upon the disconnect. Any other process initiated by the socat process will also terminate as a result. For example, if socat launched an SSHD process, that process will also terminate. Since the other process is also terminated, any child processes of that other process will also terminate.

As a result of these processes terminating, the new second process discussed above, which is configured to log information exchanged over the first connection, will detect an end of file marker, in some examples, in the intermediate log file. Upon detection of the end of file marker, the new second process also terminates. The protected computer 202 then deletes any temporary files associated with the session. In some specific examples, the protected computer 202 kills or closes any SSHD child processes for the session, kills or closes socat child processes for the session, and kills or closes record capture processes for this session (e.g., the second logging connection is also closed).

Some examples of the enterprise controller 204 include at least four components, including a database container 222, an API container 224, a web UI container 226, and an ingress container 228. The database container 222 stores user, group, and agent information. This includes information indicating the rights and privileges of users. The database container 222 also stores logging data from sessions supported by the enterprise controller 204. The database container 222 is analogous to the data store 105, discussed above with respect to FIG. 1.

The client device 206 includes one or more of a control process 216, a local socket listener 218, and a shell process 220. When the client device 206 connects to the enterprise controller 204, it authenticates against user authentication information stored in data store locally accessible to the enterprise controller (e.g., the data store 105). The client device 206 then requests a connection to the protected computer 202. Each protected computer 202 managed by the enterprise controller 204 is assigned an identifier, and the request specifies which protected computer 202 the request is directed to by specifying the identifier in the request itself. Upon receiving the request, the enterprise controller 204 validates the user/client device is authorized to establish a session with the specified protected computer 202. Authorization can include one or more of user-based permissions, group-based permissions, or role-based permissions (e.g., based on a type of task requested by the client device 206). Once authorization is successful, the client device 206 creates a new client local process for servicing the request, and initiates a new connection to the enterprise controller 204. The new connection is used for communication between the new client local process running on the client device 206 and the protected computer 202 (indirectly via the enterprise controller 204) (e.g. using the process described above with respect to the enterprise controller 204). The new client local process authenticates with an "SSHD" program on the protected computer 202.

Figure 3:
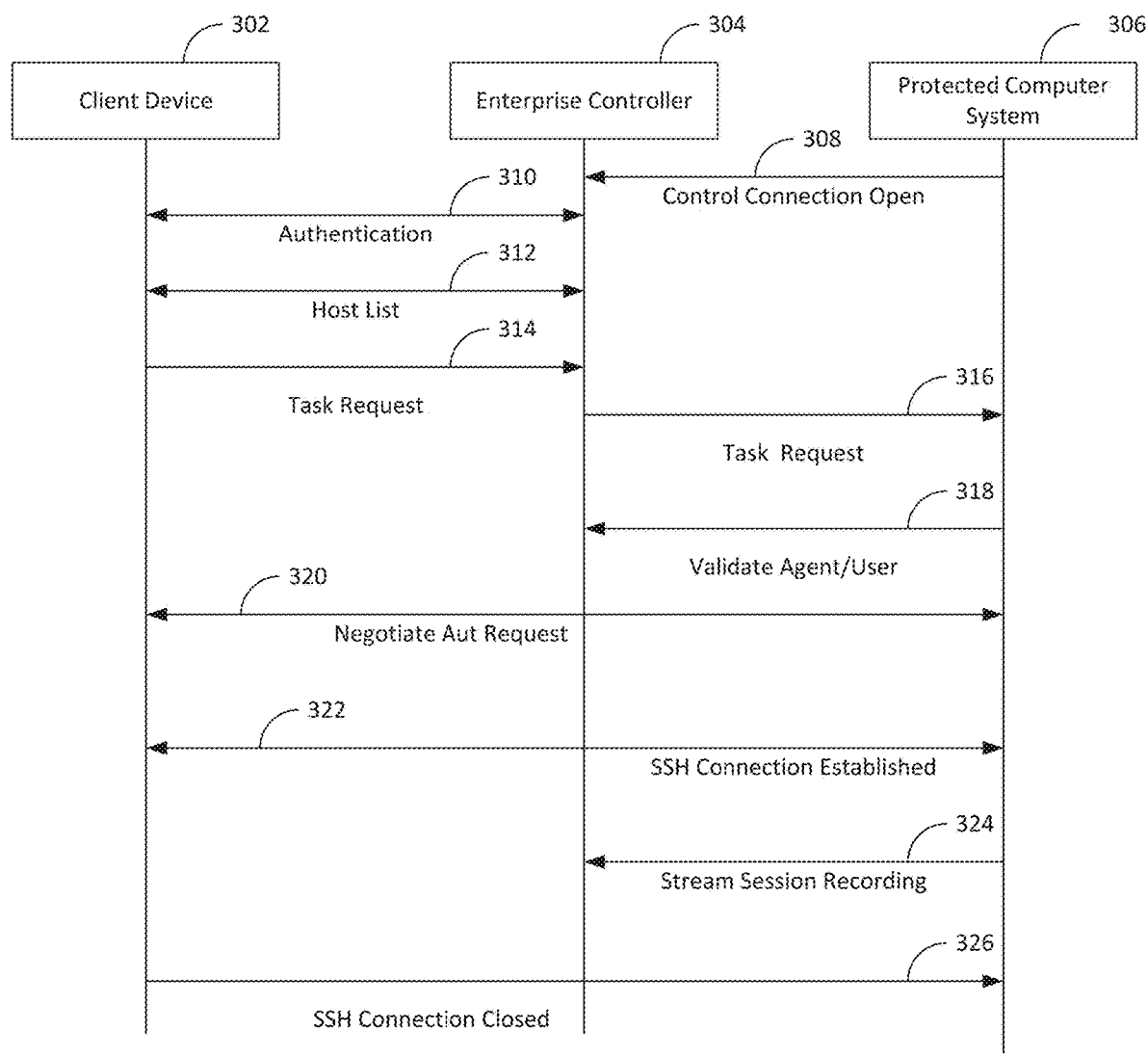
FIG. 3 is a sequence diagram showing an example exchange of messages that is implemented in one or more of the disclosed examples.

FIG. 3 is a sequence diagram showing an example exchange of messages that is implemented in one or more of the disclosed examples. FIG. 3 shows a client device 302, enterprise controller 304, and a protected computer system 306. The client device 302, enterprise controller 304, and protected computer system 306 are analogous to the client device 106, enterprise controller 104, and protected computer system 102A (or protected computer system 102B), discussed above with respect to FIG. 1.

FIG. 3 shows the protected computer system 306 initiating a control connection 308 with the enterprise controller 304. As discussed briefly above, local configuration information accessible to the protected computer system 306 indicates connection information of the enterprise controller 304 (e.g., one or more of a host name, address, listen port number). Based on this locally accessible configuration information, the protected computer system 306 initiates the control connection 308. By having the protected computer system 306 initiate the connection, security of the protected computer system 306 is preserved relative to a solution where the protected computer system 306 would accept incoming connections from the enterprise controller 304, which would require the protected computer system 306 to listen on an open network port, making the protected computer system 306 more susceptible to attack by a nefarious actor, such as the nefarious actor device 108, discussed above with respect to FIG. 1. In some examples, the control connection is opened using the secure hypertext transfer protocol (HTTPS).

FIG. 3 next illustrates an authentication message exchange 310 between the client device 302 and the enterprise controller. The authentication message exchange 310 establishes a secure communications channel between the client device 302 and the enterprise controller 304. The client device 302 initiates the authentication message exchange 310. The client device 302 passes authentication credentials (e.g., one or more of a username/account name or password) to the enterprise controller 304. The enterprise controller 304 then checks those authentication credentials against a locally accessible data store of approved authentication credentials for access to the enterprise controller 304. The enterprise controller 304 also checks a source IP address of the authentication message exchange 310 to ensure the authentication message exchange 310 was initiated by an IP address approved for communications with the enterprise controller 304. Once a connection is open between the client device 302 and the enterprise controller 304, the client device 302 and enterprise controller 304 exchange a host list 312.

FIG. 3 next shows the client device 302 sending a task request message 314 to the enterprise controller 304. The task request message 314 requests that the enterprise controller 304 establish communication between the client device 302 and the protected computer system 306. Thus, the task request message 314 identifies the protected computer system 306, given that the enterprise controller 304 manages multiple protected computer systems, at least in some examples. Thus, to which protected computer system the client device is requesting access needs to be specified in the task request message 314, The task request message 314 also requests performance of one or more functions by the protected computer system 306 on behalf of the client device 302. In response to receiving the task request message 314, the enterprise controller 304 sends a corresponding task request message 316 to the protected computer system 306.

The task request message 316 specifies, in some examples, an identity of the client device 302 and a command or function requested of the protected computer system 306 by the client device 302. For example, the task request message 316 indicates an application program to execute on behalf of the client device 302. For example, the task request message 316 indicates, in some circumstances, a request for the protected computer system 306 to execute a bash shell daemon on behalf of the client device 302.

In response to the task request message 316, the protected computer system 306 validates that the client device 302 initiating the task request has permission and/or authorization to perform the requested task on the protected computer system 306. To that end, the protected computer system 306 initiates a validation request message 318 to the enterprise controller 304, indicating whether the function requested by the task request message 316 is authorized.

Once the enterprise controller 304 and the protected computer system 306 have agreed that the client device 302 is authorized to perform the requested task, the client device 302 and protected computer system 306 perform an authentication process 320.

In response to a successful authentication between the client device 302 and the protected computer system 306, the protected computer system 306 initiates a second data connection 322 to facilitate communication of information regarding the performance of the requested task. The new data connection is a different connection than the control connection 308 discussed above. For example, the control connection 308 is a first https connection and the second data connection 322 is a second HTTPS connection.

Once the second data connection is established, the client device 302 sends commands and receives output from the protected computer system 306, indirectly (e.g., via the enterprise controller 304) via the second data connection 322. In concert with opening of the second data connection 322, the protected computer system 306 also opens a third logging connection 324 between the protected computer system 306 and the enterprise controller 304. This third logging connection facilitates logging of input/output exchanged between the client device 302 and the protected computer system 306 over the second data connection 322. As data is received by the enterprise controller 304 over the third logging connection 324, the enterprise controller 304 stores the data in a stable storage. This stored data is available for forensics purposes if needed. After the client device 302 completes its use of the second data connection 322, the client device 302 closes the second data connection 322 via message 326. In response to the message 326, the protected computer system 306 closes the second data connection 322 and the third logging connection 324.

Figure 4:
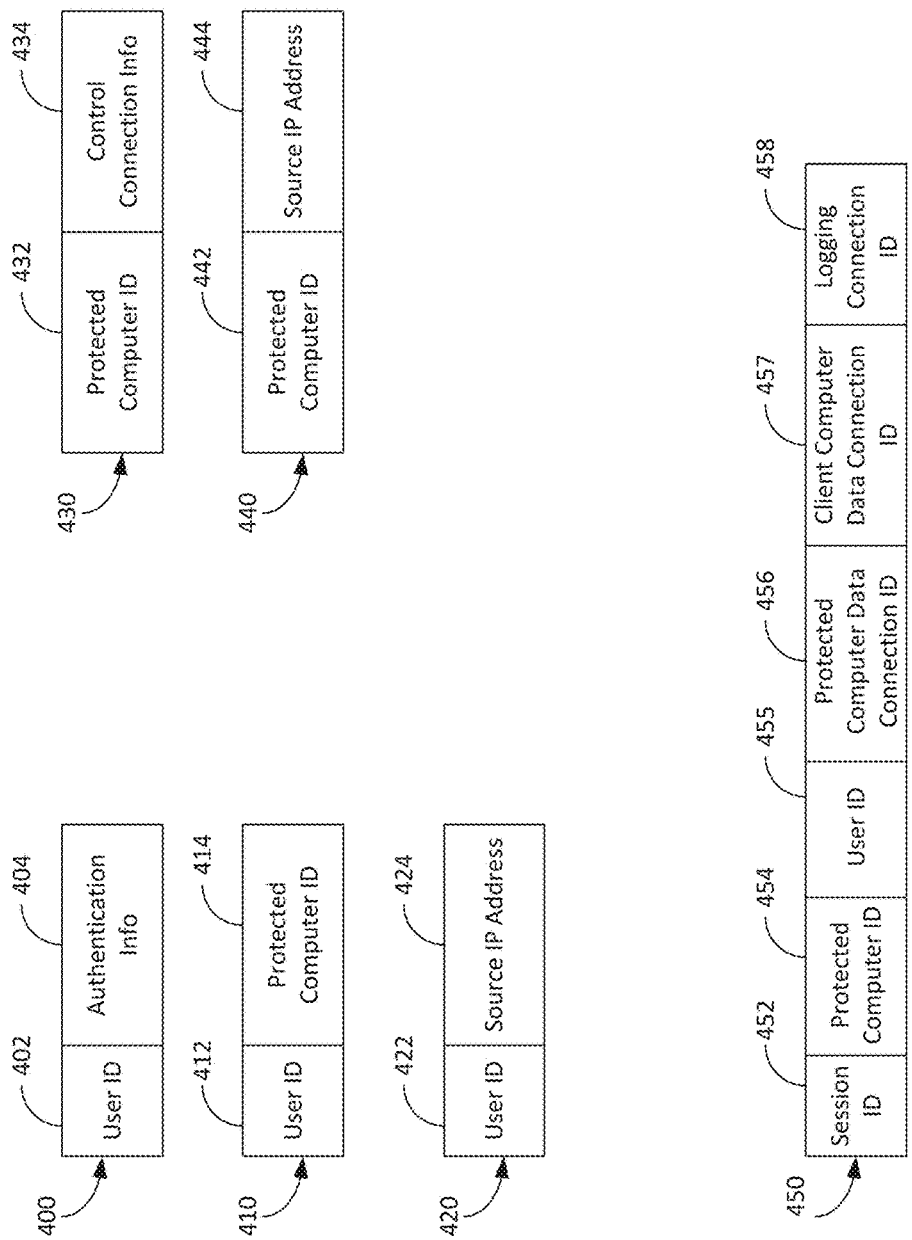
FIG. 4 illustrates example data structures implemented in one or more of the disclosed examples.

FIG. 4 illustrates example data structures implemented in one or more of the disclosed examples. While the example data structures of FIG. 4 are discussed below as relational database tables, in some examples, other data structure architectures are utilized. Some examples may use one or more of arrays, linked lists, trees, unstructured data stores, or other methods of organizing data.

FIG. 4 illustrates data structures implemented, in some examples, by an enterprise controller (e.g., enterprise controller 104). FIG. 4 shows a user table 400, user computer access table 410, user IP address table 420, protected computer system connection table 430, protected computer system IP address access list table 440, and a session table 450. In some examples, one or more of the data structures discussed below are included in the data store 105, discussed above with respect to FIG. 1.

The user table 400 includes a user identifier field 402 and a user authentication information field 404. The user identifier field 402 stores a unique identifier for a user or user account with access privileges to an enterprise controller (e.g., enterprise controller 104) and one or more protected computer systems (e.g., protected computer system 102A). The user authentication information field 404 stores user credentials (e.g., username/account name and/or password in some examples) for the identified user. Each user with access to the enterprise controller is represented by a row in the user table 400.

The user computer access table 410 includes a user identifier field 412 and a protected computer system identifier field 414. The user identifier field 412 identifies a particular user, and is cross referenceable with other user identifier field discussed with respect to FIG. 4. The protected computer system identifier field 414 identifies a particular protected computer system that is accessible by the identified user. Each user/protected computer system pairing allowed by an example has a row in the user computer access table 410.

The user IP address table 420 includes a user identifier field 422 and a source IP address field 424. The user identifier field 422 identifies a particular user and is cross referenceable with other user identifier field discussed with respect to FIG. 4. The source IP address field 424 indicates a source IP address of a device that is associated with the identified user. The enterprise controller and/or a protected computer system reject communications with a user if those requests are not made from an IP address specified in the user IP address table 420.

The protected computer system connection table 430 includes a protected computer system identifier field 432 and a control connection information field 434. The protected computer system identifier field 432 uniquely identifies a particular protected computer system, and is cross referenceable with other protected computer system identifier fields discussed with respect to FIG. 4. The control connection information field 434 defines attributes of a control connection between the protected computer system identified by the protected computer system identifier field 432 and an enterprise controller.

The protected computer system IP address access list table 440 includes a protected computer system identifier field 442 and a source IP address field 444. The protected computer system identifier field 442 uniquely identifies a particular protected computer system, and is cross referenceable with other protected computer system identifier fields discussed with respect to FIG. 4. The source IP address field 444 identifies a source IP address that is allowed to access the protected computer system identified by the protected computer system identifier field 442. An enterprise controller verifies that a client device (e.g. client device 106) has an IP address listed in the protected computer system IP address access list table 440 and associated with the protected computer system for which access is being attempted. Each paring between protected computer system and IP address from which access to said protected computer system is allowed, is represented in a row of the protected computer system IP address access list table 440.

The session table 450 includes a session identifier field 452, a protected computer system identifier field 454, a user identifier field 455, a protected computer system data connection information field 456, a client computer data connection identifier field 457, and a logging connection identifier field 458. The session identifier field 452 uniquely identifies a session between a protected computer system, an enterprise controller, and a client device. The protected computer system identifier field 454 uniquely identifies a particular protected computer system, and is cross referenceable with other protected computer system identifier fields discussed with respect to FIG. 4. The user identifier field 455 identifies a user participating in the identified session and is cross-referenceable with any of the other user identifier fields discussed with respect to FIG. 4. The protected computer system data connection information field 456 stores information defining a network connection between the identified protected computer system and an enterprise controller. The client computer data connection identifier field 457 stores information defining a network connection between the identified client computer (e.g., the protected computer system identifier field 454) and the enterprise controller. The logging connection identifier field 458 defines information identifying a network connection to facilitate logging of activity over one or more of the protected computer system data connection and/or the client computer data connection.

Figure 5:
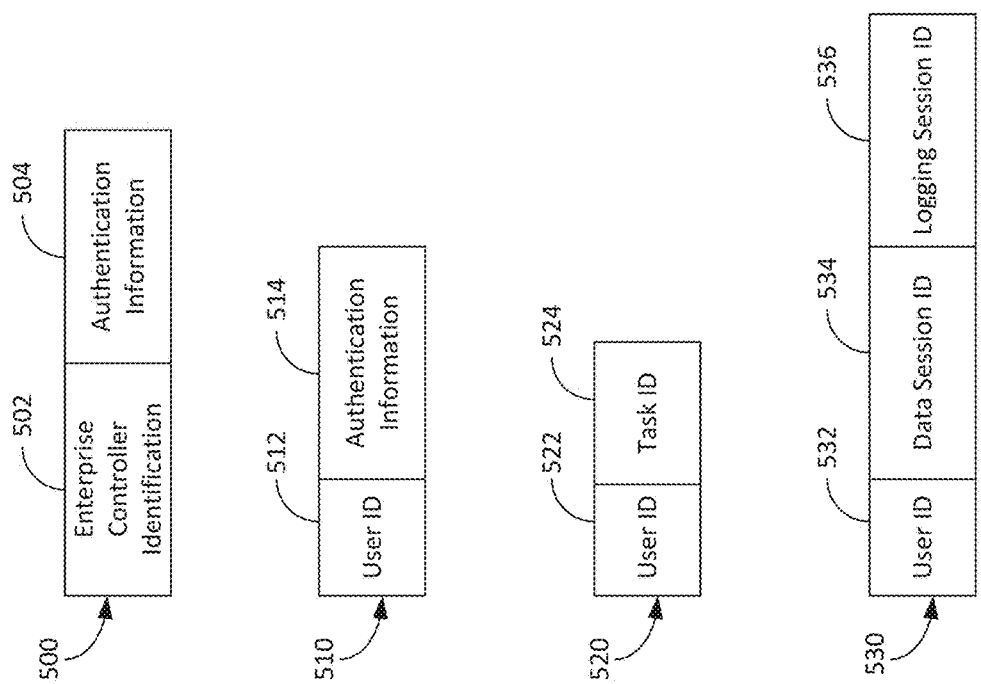
FIG. 5 illustrates example data structures implemented in one or more of the disclosed examples.

FIG. 5 illustrates example data structures implemented in one or more of the disclosed examples. While the example data structures of FIG. 5 are discussed below as relational database tables, in some examples, other data structure architectures are utilized. Some examples may use one or more of arrays, linked lists, trees, unstructured data stores, or other methods of organizing data.

In some examples, the protected computer system implements one or more of the data structures described with respect to FIG. 5. Thus, in some examples, one or more of the data structures discussed below with respect to FIG. 5 are stored in the data store 103A and/or the data store 103B. FIG. 5 shows a control connection table 500, authorized user table 510, authorized task table 520, and a session table 530. The control connection table 500 includes an enterprise controller identification field 502 and an authentication information field 504.

The authorized user table 510 includes a user identifier field 512 and authentication information field 514. The user identifier field 512 uniquely identifies a user and is cross-referenceable with at least other user identifier fields discussed with respect to FIG. 5.

The authorized task table 520 includes a user identifier field 522 and a task identifier field 524. The user identifier field 522 uniquely identifies a user and is cross-referenceable with at least other user identifier fields discussed with respect to FIG. 5.

The session table 530 includes a user identifier field 532, data session identifier field 534, and logging session identifier field 536. The user identifier field 532 uniquely identifies a user and is cross-referenceable with at least other user identifier fields discussed with respect to FIG. 5. The data session identifier field 534 identifies a network data connection between the protected computer system and an enterprise controller that carries data for the session. The logging session identifier field 536 identifies a network data connection that carries logging data for data transmitted over the data connection identified by the field 534.

Figure 6:
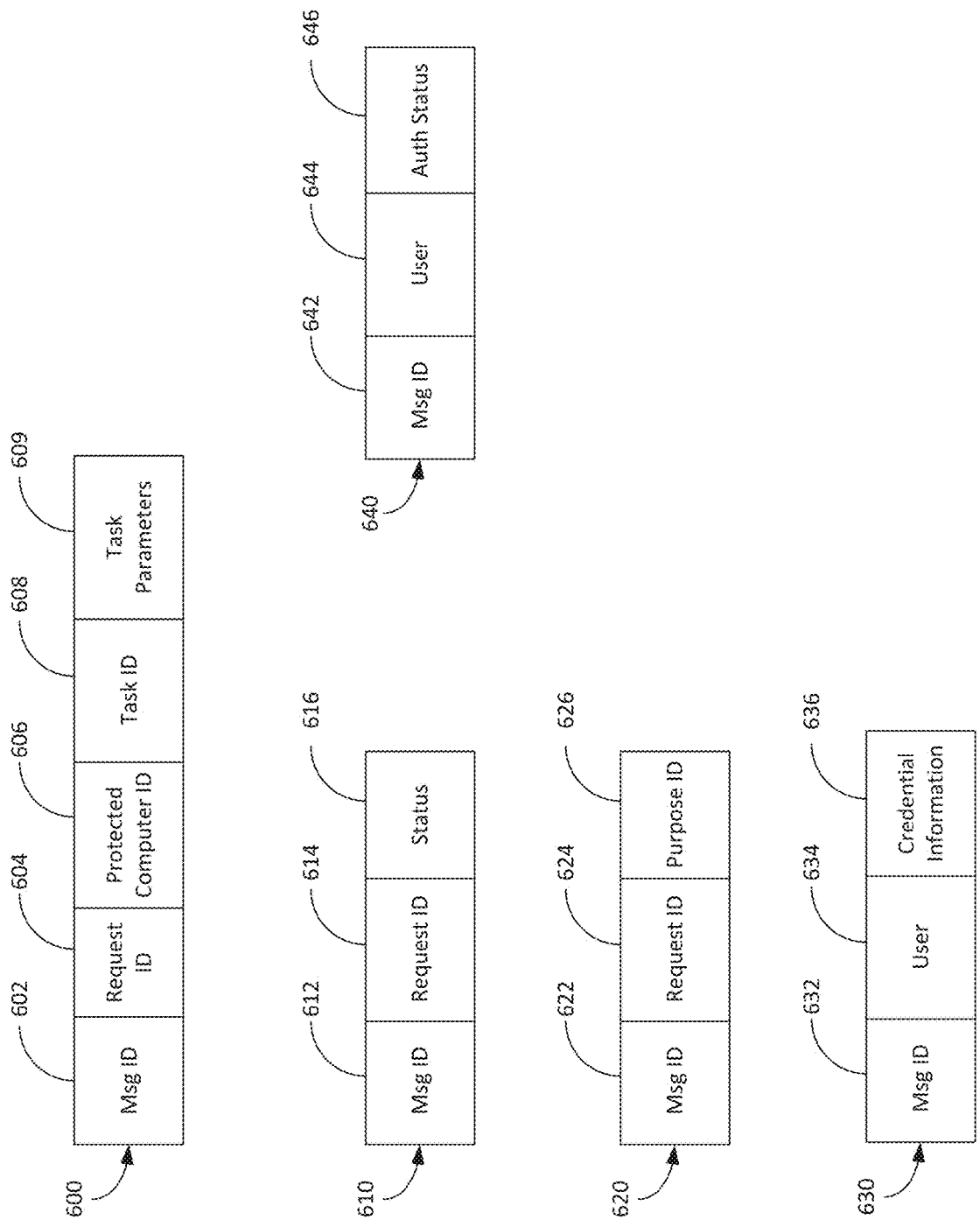
FIG. 6 illustrates example messages implemented in one or more of the disclosed examples.

FIG. 6 illustrates example messages implemented in one or more of the disclosed examples. FIG. 6 illustrates an example task request message 600, an example task response message 610, an example channel initiation message 620, an example user authentication message 630, and an example user authentication response message 640. The example task request message 600 includes a message identifier field 602 a request identifier field 604, a protected computer identifier field 606, a task identifier field 608, and a task parameters field 609. The message identifier field 602 identifies the message (e.g., via a predefined constant value) as a task request message. The request identifier field 604 uniquely identifies a particular request made by the enterprise controller (e.g., 104). The enterprise controller can use a request identifier value to match up a task response with a corresponding task request message. In some examples, the example task request message 600 is analogous to the task request message 316, discussed above with respect to FIG. 3.

The protected computer identifier field 606 identifies a protected computer to which the task (requested by the task request message) is directed. For example, an enterprise controller manages multiple protected computers, and thus one of these protected computers is identified to facilitate the execution of the requested task. The task identifier field 608 indicates a type of task requested (e.g., via a predefined constant value that maps to a task type). The task parameters field 609 identifies one or more input parameters associated with the task requested. For example, if the task request is a request to initiate a process on a protected computer system, the task parameters field 609 indicates a name or file reference to the process being initiated.

The task response message 610 includes a message identifier field 612, request identifier field 614, and a status field 616. Similar to the message identifier field 602, the message identifier field 612 identifies (e.g., via a predefined constant value) the message as a task response message. The request identifier field 614 indicates a request identifier that was originally specified in a task request message that corresponds to this task response message. The status field 616 indicates status information relating to the original task request. For example, the status field 616 indicates whether the task was completed successfully. The status field 616 indicates whether a new connection is expected to be opened to the protected computer to which the task was sent. The task response message 610 is sent from the protected computer system 306 to the enterprise controller 304, discussed above with respect to FIG. 3.

The example channel initiation message 620 includes a message identifier field 622, request identifier field 624, and a purpose identifier field 626. Similar to the message identifier field 602 and message identifier field 612, the message identifier field 622 identifies (e.g., via a predefined constant value) the channel initiation message 620 as a connection initiation message. The request identifier field 624 indicates a request identifier that was originally specified in a task request message that corresponds to this channel initiation message. The purpose identifier field 626 indicates purpose information relating to purpose of the new channel (over which the channel initiation message is sent). For example, the purpose identifier field 626 indicates, in some examples, that the channel is a stdin/stdout channel for a particular task (indicated via the request identifier field 624). The purpose identifier field 626 alternatives indicates that a channel is a logging channel for a particular task (indicated via the request identifier field 624). The status field 616 indicates whether a new connection is expected to be opened to the protected computer to which the task was sent.

The example user authentication message 630 includes a message identifier field 632, user field 634, and a credential information field 636. Similar to the message identifier field 602 message identifier field 612, and the message identifier field 622, the message identifier field 632 identifies (e.g., via a predefined constant value) the message 630 as a user authentication message. The user field 634 identifies a user that is attempting to authenticate. In some examples, the user field 634 indicates a name of the user. The credential information field 636 identifies user credentials. For example, the credential information field 636 includes information defining a password of the user.

The user authentication response message 640 includes a message identifier field 642, user field 644, and an authentication status field 646. Similar to the message identifier field 602 message identifier field 612, the message identifier field 622, and the message identifier field 632, the message identifier field 642 identifies (e.g., via a predefined constant value) the user authentication response message 640 as a user authentication response message. The user field 644 identifies a user associated with an authentication attempt. In some examples, the user field 644 indicates a name of the user. The authentication status field 646 identifies a result of an authentication attempt. Thus, the authentication status field 646 indicates, in some examples, whether a prior attempt to authentication (e.g., via the message 630) was successful. If authentication is successful, an enterprise controller allows the authenticated user to initiate task requests to one or more protected computer systems controlled or managed by the enterprise controller. If the authentication is not successful, the enterprise controller denies any attempt by the user (and, in some examples, an associated client device) to access protected computer(s) managed by the enterprise controller.

Figure 7:
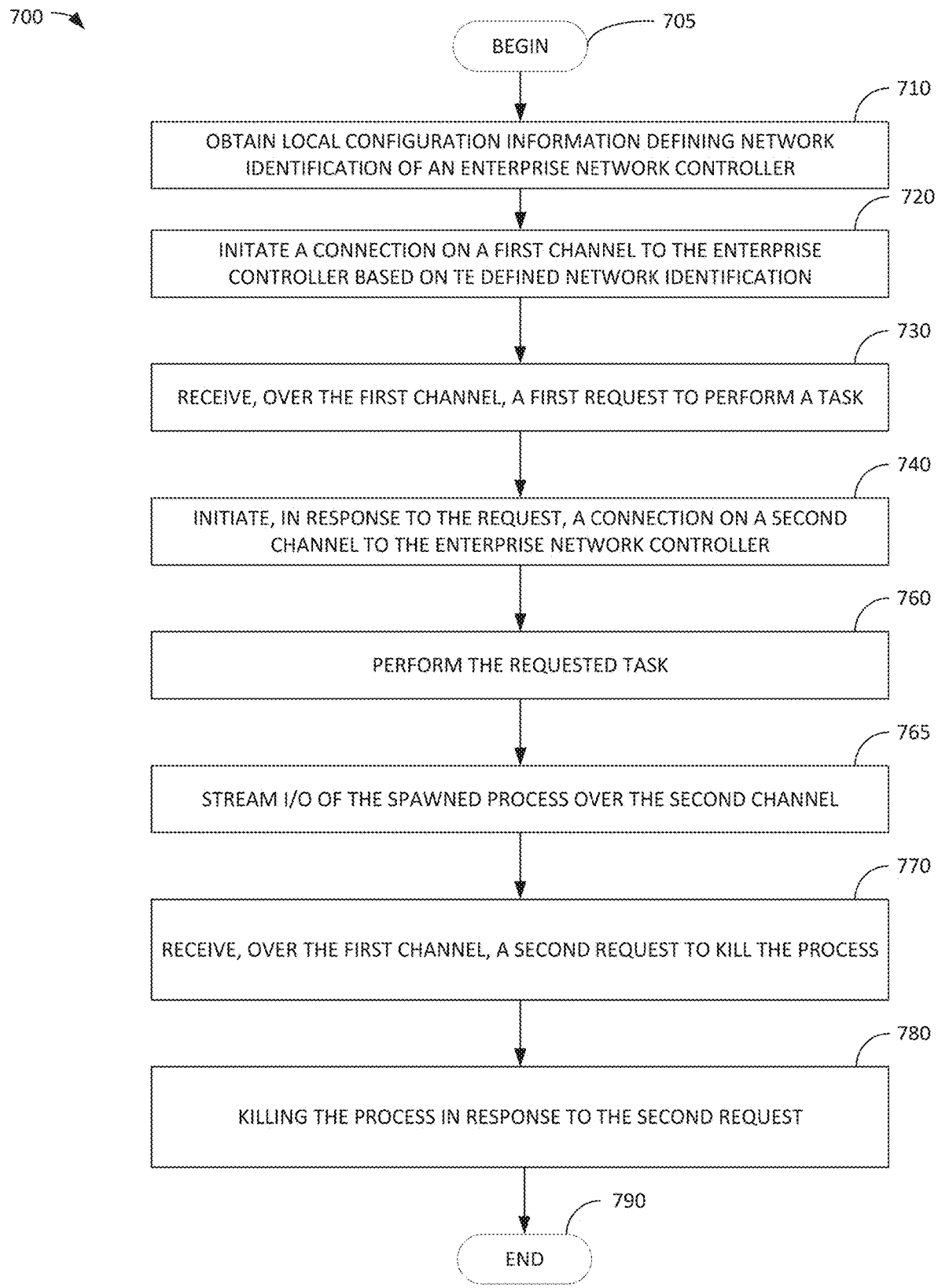
FIG. 7 is a flowchart of an example method implemented in one or more of the disclosed examples.

FIG. 7 is a flowchart of an example method implemented in one or more of the disclosed examples. In some examples, one or more of the functions discussed below with respect to FIG. 7 and method 700 are performed by hardware processing circuitry. For example, in some examples, a hardware processor (e.g., hardware processor 902) is configured by instructions (e.g., instructions 924) stored in a memory (e.g., memory 904 and/or 906) to perform one or more of the functions discussed below. In some examples, method 700 is performed by a protected computer system, such as protected computer system 102A discussed above with respect to FIG. 1. In the discussion below of method 700, a device performing the method 700 is, in some cases, referred to as an "executing device."

After start operation 705, method 700 moves to operation 710. In operation 710, local configuration information is obtained. The local configuration information defines network identification of an enterprise controller. In other words, for example, as discussed above with respect to FIG. 1, a protected computer (e.g., the protected computer system 102A or the protected computer system 102B) reads local configuration information from a locally accessible data store (e.g., the data store 103A or the data store 103B) to determine how to contact an enterprise controller (e.g., the enterprise controller 104). The network identification includes, in some examples, one or more of a hostname, IP address, and/or control connection port number of the enterprise controller (e.g., a network port upon which the enterprise controller is listening).

In operation 720, a connection of a first channel is initiated to the enterprise controller based on the network identification. For example, in some examples, operation 720 opens a secure connection (e.g., HTTPS) to the enterprise controller via the network identification. Once the connection is open, it forms the first channel, which allows data to flow bi-directionally between the enterprise controller and the executing device (e.g., a protected computer).

In operation 730, a request is received to perform a task. The request is received over the control connection. The request includes one or more of the fields discussed above with respect to the example task request message 600 of FIG. 6. The request indicates (e.g., via the task identifier field 608) that the executing device is to spawn or create a process. The request further indicates a name of or otherwise identifies the process to create (e.g., via the task parameters field 609).

Operation 740 initiates a second (e.g., data) connection to the enterprise controller in response to the request. If the request of operation 730 requests creation of a process, operation 740 opens a new data connection to provide for an input/output channel (e.g., a second channel) between the new process and the enterprise controller. The second connection is initiated as an https connection to the enterprise controller. After the second connection/channel is established, operation 740 also transmits a channel initiation message over the second connection/channel to inform the enterprise controller of the purpose of the new channel. The channel initiation message includes one or more of the fields discussed above with respect to the example channel initiation message 620.

In operation 760, the requested task is performed. Performing the requested task includes
 a spawning or creating a process specified in the task request message of operation 730; and
 b opening a log channel to the enterprise controller (e.g., an HTTPS connection).

The logging channel is used to log activity of the second channel to the enterprise controller, so it can be stored. In some examples, the log activity is used for forensics purposes. After the logging channel is created, a channel initiation message is sent over the logging channel to indicate to the enterprise controller the intended purposes of the newly opened channel. (e.g., the purpose field 626 indicates that the newly initiated channel is a logging channel via a predefined constant value designated for indicating same). The request identifier field 624 of the channel initiation indicates the request id of the original task request message received in operation 730. This allows the enterprise controller to match up the logging channel with the input/output channel, and with the original request, and therefore identifying a client device that originally initiated the task.

In operation 765, output of the requested task is linked to the second connection, Input to the requested task is also linked to the second connection. In other words, if the requested task was a request to spawn or otherwise create a new process, any write operations to standard out by the newly created process are streamed over the second channel to the enterprise controller. The enterprise controller then, in some cases, provides the streamed output to a remote computer, such as a client device. Similarly, any data received from the enterprise controller by the protected computer over the second channel is provided as input (e.g., stdin) to the newly created process.

In operation 770, a second request is received over the first channel. The second request is a request to shut down or otherwise end the task of operation 760. The second request includes a request id that matches or otherwise corresponds to an original task request, such as the task request received in operation 730.

In operation 780, if a task was spawned or otherwise created in operation 760, that task is closed or killed in operation 780 (in response to the second request of operation 770). If a reporting logging channel was also created to facilitate the execution of the requested task, the log channel is also closed or killed in operation 780.

Some examples of method 700 includes monitoring the spawned process and detecting, based on the monitoring, that the spawned process is no longer active. For example, in some cases, a nefarious actor attempts to subvert protections of the protected computer by tampering with the spawned process or the logging process. To ensure that the nefarious actor is unable to compromise the protected computer, if the monitoring detects that either of these processes transitions into a different state, such as a paused state or shutdown state, some examples of method 700 shut down the spawned process to ensure no actions are taken on the protected computer without the protections provided by either the data connection and/or the logging connection.

After operation 780, method 700 moves to end operation 790.

Figure 8:
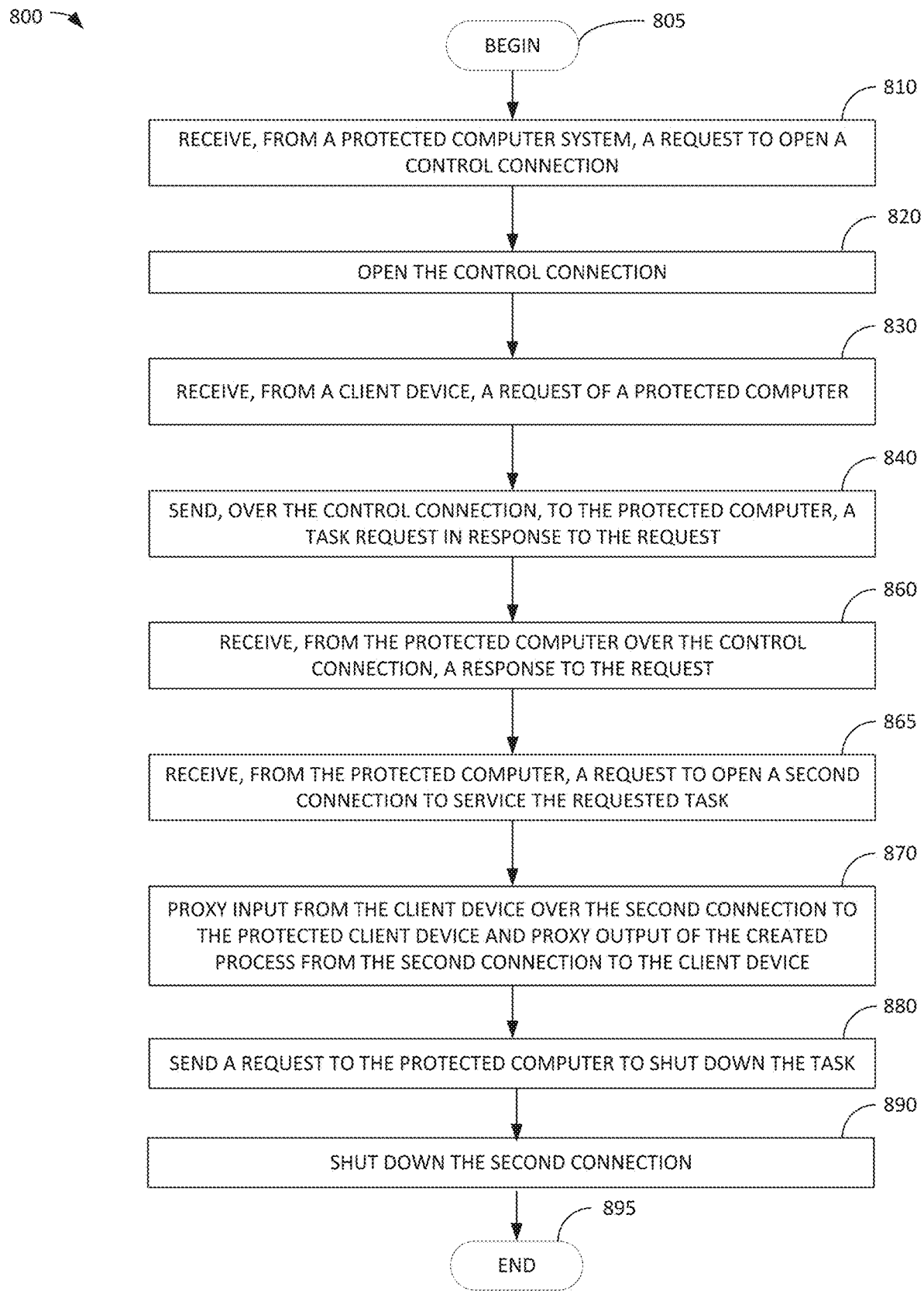
FIG. 8 is a flowchart of an example method implemented in one or more of the disclosed examples.

FIG. 8 is a flowchart of an example method implemented in one or more of the disclosed examples. In some examples, one or more of the functions discussed below with respect to FIG. 8 and method 800 are performed by hardware processing circuitry. For example, in some examples, a hardware processor (e.g., hardware processor 902) is configured by instructions (e.g., instructions 924) stored in a memory (e.g., memory 904 and/or 906) to perform one or more of the functions discussed below. In some examples, method 800 is performed by an enterprise controller, such as the enterprise controller 104 discussed above with respect to FIG. 1. In the discussion below of method 800, a device performing the method 800 is, in some cases, referred to as an "executing device."

After start operation 805, the method 800 moves to operation 810. In operation 810, a request to open a control connection is received from a protected computer system. As discussed above, some of the disclosed examples provide protection of a computer system via, in part, avoidance of maintaining or opening network ports upon which to listen for incoming connection requests. To avoid having the protected computer listen on a network port, the executing device (e.g., an enterprise controller such as the enterprise controller 104 or enterprise controller 204 or enterprise controller 304) discussed above listens on a port for connection requests from a protected computer. The protected computer contacts the enterprise controller based on configuration information at the protected computer. By initiating the control connection at the protected computer, there is no opportunity for the protected computer to be attacked via that connection e.g., especially if the control connection utilizes a secure protocol such as HTTPS).

In operation 820, the control connection is opened. Operation 820 includes invoking an "accept" socketio call to acknowledge and complete the connection initiated by the protected computer system (and for which a request to open the connection was received in operation 810). The control connection is a secure hypertext transfer protocol (HTTPS) connection.

In operation 830, a request is received from a client device (e.g., via the task request message 314 of FIG. 3). The request is a request by the client device to obtain a service from a protected computer. For example, an enterprise controller receives a task request message that includes one or more fields of the example task request message 600 discussed above with respect to FIG. 6.

Operation 830 then verifies whether the client device from which the request is received is authorized to interact with or otherwise access a protected computer specified in the request (e.g., via field 606). Operation 830 consults a data structure analogous to the user computer access table 410 to determine if a particular user making the request (e.g. previously indicated in a user authentication message such as the example user authentication message 630 of FIG. 6) is authorized to access a protected computer also indicated in the request (e.g. via field 606).

Operation 830 also includes authorizing the user to make the request. For example, a device executing the method 800 receives an authentication/authorization message including user authentication information (e.g. the message includes, one or more fields of the user authentication message 630, discussed above with respect to FIG. 6). The authentication information is then compared to information stored in a data structure analogous to the user table 400 discussed above with respect to FIG. 4, If the authentication information provided in the authentication/authorization message matches an entry included in the authentication data structure, the user is successfully authenticated. Otherwise, the authentication is not successful.

Operation 830 includes sending an authentication response message to the client device indicating a result of the authentication. The authentication response message includes one or more of the fields discussed above with respect to the user authentication response message 640.

In operation 840, a task request is sent to the protected computer over the control connection. The task request is sent to the protected computer in response to the request received in operation 830. The task request indicates that the client device seeks for the protected computer to perform a service on its behalf. For example, the client device requests the protected computer to start a daemon process (e.g., specified in the task parameters field 609 of the example task request message 600, in some examples), and facilitate input/output between the daemon process and the client device. A task identifier is provided to the protected computer to define what service the client device is requesting the protected computer to perform (e.g., via the task identifier field 608). Some examples maintain predefined mappings between task identifiers and tasks, with each of the client device and protected computer both understanding this mapping and being able to communicate the tasks between them based on the shared understanding.

Some examples of method 800 include operation 860, where a response to the task request is received over the control connection. The response indicates whether the request to perform the task is approved or rejected. If the task is approved, the enterprise controller may receive a connection request from the protected computer to facilitate performance (e.g., input/output streaming) of the task, as discussed below with respect to operation 865. If the request to perform the task is rejected by the protected computer, the enterprise controller relays this information back to the client device that originated the request.

In operation 865, a request to open a second connection is received from the protected computer. The connection is for the purposes of providing input and/or output streaming of the created process. Once the second channel is open, a channel initiation message is received over the second channel from the protected computer. By decoding the channel initiating message, the enterprise controller associates the second channel with the task. In some examples, the second connection is an HTTPS connection. The executing device listens on a network port to receive the request to open the second connection. A connection initiation message is received from the protected computer indicating the purpose of the new second connection. The connection initiation message indicates a request id that corresponds to an original request received from the client device. The executing device is then able to associate the new second connection with processing of that request.

In operation 870, input data received from the client device (and designated for the protected computer) is proxied over the second connection to the protected client device. In operation 870, the executing device also proxies output data from the created process (that is received over the second connection) by the executing device to the client device.

In other words, output generated by the protected computer while performing the requested task, is received by the executing device over the second connection. The executing device then identifies to which client device the output should be provided. For example, the executing device maintains a mapping between connections established with a protected computer and connections maintained with client devices. Thus, data received from the protected computer is then relayed or proxied to a client device based on this mapping. Similarly, data received from the client device is relayed or proxied by the executing device to the protected computer. In this way, a client device can exchange information with a service running on the protected computer (e.g., a bash shell or other program receiving input from the client device and generating output to the client device).

In operation 880, a request is sent to the protected computer to shut down the task. The request includes one or more fields of the task request message 600, discussed above with respect to FIG. 6. A task request message sent from the enterprise controller to the protected computer differs somewhat from the task request message sent from a client device to the enterprise controller. For example, a task request message sent from the enterprise controller to the protected computer does not include, in at least some examples, the protected computer identifier field 606. In the case of shutting down a process or task, the task identifier field 608 identifies that the task is to shut down the task or process, and the task parameters field 609 identifies the specific process (e.g., by storing a process identifier or other method of identifying a process, such as a process name).

In operation 890, the second connection is shut down. In some examples, shutting down the second connection includes invoking a socketio call such as "close( )" on a socket associated with the second connection. Shutting down the second connection includes sending a message over the second connection indicating the protected computer is to shut down the connection, and then waiting for a notification that the connection is shut down.

After operation 890 completes, the method 800 moves to end operation 895.

Figure 9:
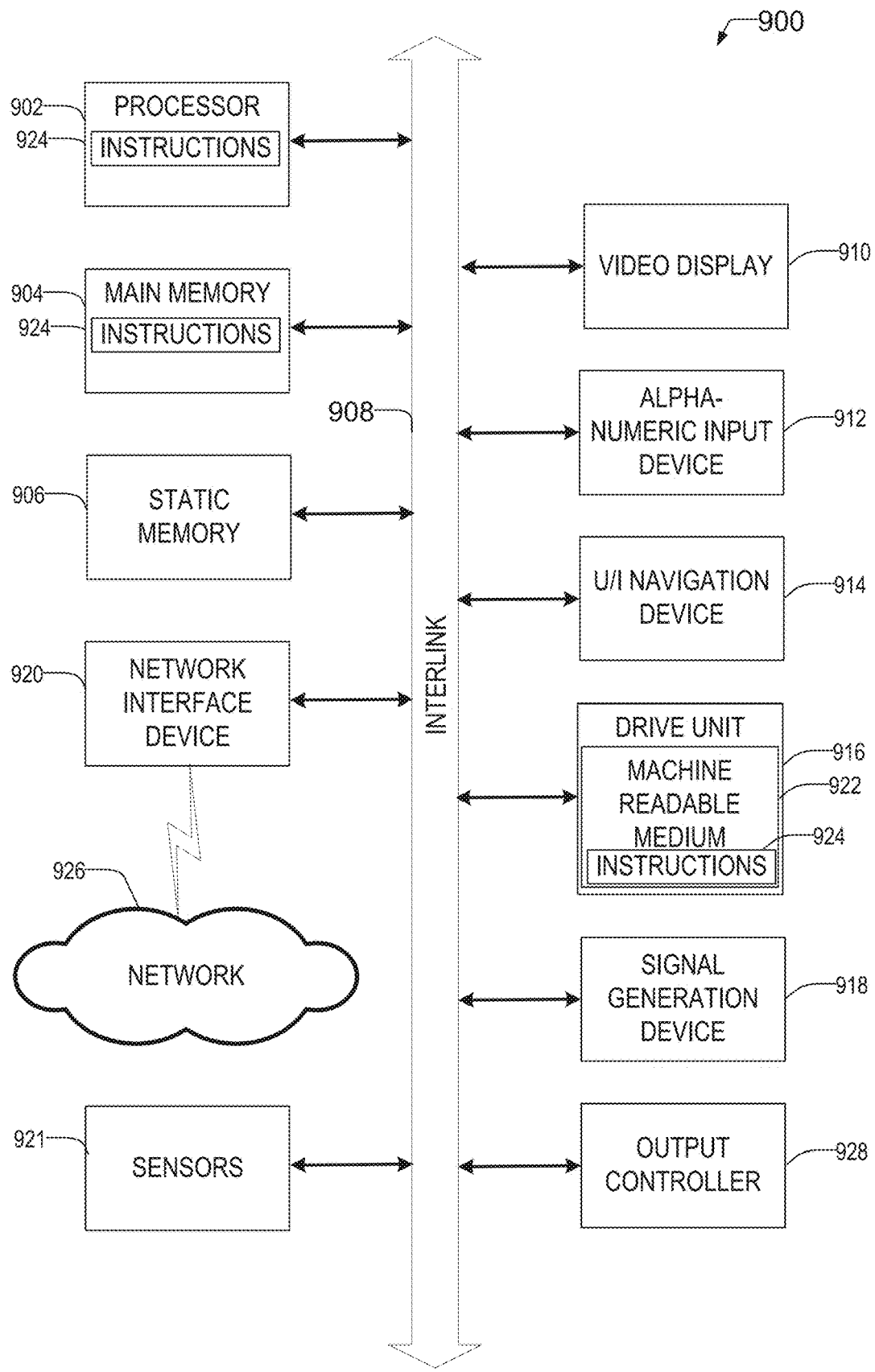
FIG. 9 illustrates a block diagram of an example machine upon which any one or more of the techniques (e.g., methodologies) discussed herein may perform.

FIG. 9 illustrates a block diagram of an example machine 900 upon which any one or more of the techniques (e.g., methodologies) discussed herein may perform. In some examples, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. In various examples, machine 900 may perform one or more of the processes described above with respect to FIGS. 1-8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by, firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904, and a static memory 906, some or all of which may communicate with each other via an interlink 908 (e.g., bus). The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine-readable media. In some examples, machine-readable media may include machine-readable media that is not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks); Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method performed by hardware processing circuitry of a computer, comprising: obtaining local configuration information defining network identification of an enterprise controller; initiating a connection on a first channel to the enterprise controller based on the defined network identification; receiving, over the first channel, a first request to spawn a process; initiating, in response to the request, a connection on a second channel to the enterprise controller; spawning a process in response to the request; streaming input/output (I/O) of the spawned process over the second channel; receiving, over the first channel, a second request to shut down the process; and shutting down the process in response to the second request.

In Example 2; the subject matter of Example 1 optionally includes validating the first request based on local configuration information, and wherein the spawning is in response to the validation.

In Example 3, the subject matter of Example 2 optionally includes wherein the first request includes user credentials, and the local configuration information defines user credentials defining users with access to the computer.

In Example 4, the subject matter of any one or more of Examples 1-3 optionally include wherein opening the first channel comprises opening an hops connection with the enterprise controller based on the defined network identification and opening the second channel comprising opening a second hops connection with the enterprise controller.

In Example 5, the subject matter of Example 4 optionally includes wherein the computer is accessible via a public network.

In Example 6, the subject matter of Example 5 optionally includes wherein neither the first channel nor the second channel are visible via a port scan of the computer.

In Example 7; the subject matter of any one or more of Examples 1-6 optionally include wherein the first request indicates a request to open a bash shell, and wherein the spawning of the process executes a bash program.

In Example 8, the subject matter of any one or more of Examples 1-7 optionally include streaming the I/O of the spawned process over a network connection to a remote computer.

In Example 9, the subject matter of any one or more of Examples optionally include receiving, over the first channel, a third request to spawn a second process; initiating, in response to the third request, a connection on a third channel to the enterprise controller; spawning the second process in response to the request; streaming input/output (I/O) of the spawned second process over the third channel; monitoring the spawned second process; detecting, based on the monitoring, the spawned second process has transitioned from an active run state; and closing the third channel in response to the detecting.

Example 10 is a system, comprising: hardware processing circuitry; one or more hardware memories storing instructions that when executed configure the hardware processing circuitry to perform operations comprising: obtaining local configuration information defining network identification of an enterprise controller; initiating a connection on a first channel to the enterprise controller based on the defined network identification; receiving, over the first channel, a first request to spawn a process; initiating, in response to the request, a connection on a second channel to the enterprise controller; spawning a process in response to the request; streaming input/output (I/O) of the spawned process over the second channel; receiving, over the first channel, a second request to shut down the process; and shutting down the process in response to the second request.

In Example 11, the subject matter of Example 10 optionally includes the operations further comprising validating the first request based on local configuration information; and wherein the spawning is in response to the validation.

In Example 12, the subject matter of Example 11 optionally includes wherein the first request includes user credentials, and the local configuration information defines user credentials defining users with access to the computer.

In Example 13, the subject matter of any one or more of Examples 10-12 optionally include wherein opening the first channel comprises opening an https connection with the enterprise controller based on the defined network identification and opening the second channel comprising opening a second https connection with the enterprise controller.

In Example 14, the subject matter of Example 13 optionally includes wherein neither the first channel nor the second channel are visible via a port scan of the computer.

In Example 15, the subject matter of any one or more of Examples 10-14 optionally include wherein the first request indicates a request to open a bash shell, and wherein the spawning of the process executes a bash program.

In Example 16, the subject matter of any one or more of Examples 10-15 optionally include the operations further comprising streaming the I/O of the spawned process over a network connection to a remote computer.

In Example 17, the subject matter of any one or more of Examples 10-16 optionally include the operations further comprising: receiving, over the first channel, a third request to spawn a second process; initiating, in response to the third request, a connection on a third channel to the enterprise controller; spawning the second process in response to the request; streaming input/output (I/O) of the spawned second process over the third channel; monitoring the spawned second process; detecting, based on the monitoring, the spawned second process has transitioned from an active run state; and closing the third channel in response to the detecting.

Example 18 is a non-transitory computer readable storage medium comprising instructions that when executed configure hardware processing circuitry to perform operations comprising: obtaining local configuration information defining network identification of an enterprise controller; initiating a connection on a first channel to the enterprise controller based on the defined network identification; receiving, over the first channel, a first request to spawn a process; initiating, in response to the request, a connection on a second channel to the enterprise controller; spawning a process in response to the request; streaming input/output (I/O) of the spawned process over the second channel; receiving, over the first channel, a second request to shut down the process; and shutting down the process in response to the second request.

In Example 19, the subject matter of Example 18 optionally includes the operations further comprising validating the first request based on local configuration information, and wherein the spawning is in response to the validation.

In Example 20, the subject matter of Example 19 optionally includes wherein the first request includes user credentials, and the local configuration information defines user credentials defining users with access to the computer.

In Example 21, the subject matter of any one or more of Examples 18-20 optionally include wherein opening the first channel comprises opening an https connection with the enterprise controller based on the defined network identification and opening the second channel comprising opening a second https connection with the enterprise controller.

In Example 22, the subject matter of Example 21 optionally includes wherein neither the first channel nor the second channel are visible via a port scan of the computer.

In Example 23, the subject matter of any one or more of Examples 18-22 optionally, include wherein the first request indicates a request to open a bash shell, and wherein the spawning of the process executes a bash program.

In Example 24, the subject matter of any one or more of Examples 18-23 optionally include the operations further comprising streaming the I/O of the spawned process over a network connection to a remote computer.

In Example 25, the subject matter of any one or more of Examples 18-24 optionally include the operations further comprising: receiving, over the first channel, a third request to spawn a second process; initiating, in response to the third request, a connection on a third channel to the enterprise controller; spawning the second process in response to the request; streaming input/output (I/O) of the spawned second process over the third channel; monitoring the spawned second process; detecting, based on the monitoring, the spawned second process has transitioned from an active run state; and closing the third channel in response to the detecting.

The invention claimed is:

1. A method performed by hardware processing circuitry of a computer, comprising:
   obtaining local configuration information defining network identification of an enterprise controller;
   initiating a connection on a first channel to the enterprise controller based on the defined network identification;
   receiving, over the first channel, a first request to spawn a process;
   initiating, in response to the request, a connection on a second channel to the enterprise controller;
   spawning a process in response to the request;
   streaming input/output (I/O) of the spawned process over the second channel;
   receiving, over the first channel, a second request to shut down the process; and
   shutting down the process in response to the second request.

2. The method of claim 1, further comprising validating the first request based on local configuration information, and wherein the spawning is in response to the validation.

3. The method of claim 2, wherein the first request includes user credentials, and the local configuration information defines user credentials defining users with access to the computer.

4. The method of claim 1, wherein opening the first channel comprises opening an HTTPS connection with the enterprise controller based on the defined network identification and opening the second channel comprising opening a second HTTPS connection with the enterprise controller.

5. The method of claim 4, wherein the computer is accessible via a public network.

6. The method of claim 5, wherein neither the first channel nor the second channel are visible via a port scan of the computer.

7. The method of claim 1, wherein the first request indicates a request to open a hash shell, and wherein the spawning of the process executes a bash program.

8. The method of claim 1, further comprising streaming the I/O of the spawned process over a network connection to a remote computer.

9. The method of claim 1, further comprising:
receiving, over the first channel, a third request to spawn a second process;
initiating, in response to the third request, a connection on a third channel to the enterprise controller;
spawning the second process in response to the request;
streaming input/output (I/O) of the spawned second process over the third channel;
monitoring the spawned second process;
detecting, based on the monitoring; the spawned second process has transitioned from an active run state; and
closing the third channel in response to the detecting.

10. A system, comprising:
hardware processing circuitry;
one or more hardware memories storing instructions that when executed configure the hardware processing circuitry to perform operations comprising:
obtaining local configuration information defining network identification of an enterprise controller;
initiating a connection on a first channel to the enterprise controller based on the defined network identification;
receiving, over the first channel, a first request to spawn a process;
initiating, in response to the request, a connection on a second channel to the enterprise controller;
spawning a process in response to the request;
streaming input/output (I/O) of the spawned process over the second channel;
receiving, over the first channel, a second request to shut down the process; and
shutting down the process in response to the second request.

11. The system of claim 10, the operations further comprising validating the first request based on local configuration information, and wherein the spawning is in response to the validation.

12. The system of claim 11, wherein the first request includes user credentials, and the local configuration information defines user credentials defining users with access to the system.

13. The system of claim 10, wherein opening the first channel comprises opening an https connection with the enterprise controller based on the defined network identification and opening the second channel comprising opening a second https connection with the enterprise controller.

14. The system of claim 10, wherein the first request indicates a request to open a bash shell, and wherein the spawning of the process executes a bash program.

15. The system of claim 10, the operations further comprising streaming the I/O of the spawned process over a network connection to a remote computer.

16. The system of claim 10, the operations further comprising:
receiving, over the first channel, a third request to spawn a second process;
initiating, in response to the third request, a connection on a third channel to the enterprise controller;
spawning the second process in response to the request;
streaming input/output (I/O) of the spawned second process over the third channel;
monitoring the spawned second process;
detecting, based on the monitoring, the spawned second process has transitioned from an active run state; and
closing the third channel in response to the detecting.

17. A non-transitory computer-readable storage medium comprising instructions that when executed configure hardware processing circuitry to perform operations comprising:
obtaining local configuration information defining network identification of an enterprise controller;
initiating a connection on a first channel to the enterprise controller based on the defined network identification;
receiving, over the first channel, a first request to spawn a process;
initiating, in response to the request, a connection on a second channel to the enterprise controller;
spawning a process in response to the request;
streaming input/output (I/O) of the spawned process over the second channel;
receiving, over the first channel, a second request to shut down the process; and
shutting down the process in response to the second request.

18. The non-transitory computer-readable storage medium of claim 17, the operations further comprising validating the first request based on local configuration information, and wherein the spawning is in response to the validation.

19. The non-transitory computer-readable storage medium of claim 18, wherein the first request includes user credentials, and the local configuration information defines user credentials defining users with access to the computer.

20. The non-transitory computer-readable storage medium of claim 17, wherein opening the first channel comprises opening an https connection with the enterprise controller based on the defined network identification and opening the second channel comprising opening a second https connection with the enterprise controller.

* * * * *